United States Patent
Cao et al.

(10) Patent No.: US 11,282,045 B2
(45) Date of Patent: Mar. 22, 2022

(54) METHODS, DEVICES, AND SYSTEMS FOR VERIFYING DIGITAL TICKETS AT A CLIENT

(71) Applicant: Alibaba Group Holding Limited, Grand Cayman (KY)

(72) Inventors: Jie Cao, Hangzhou (CN); Yuhui Feng, Hangzhou (CN); Wei Meng, Hangzhou (CN); Xinwei Li, Hangzhou (CN); Shuai He, Hangzhou (CN); Chongyuan Tang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/463,102

(22) PCT Filed: Dec. 14, 2017

(86) PCT No.: PCT/CN2017/116092
§ 371 (c)(1),
(2) Date: May 22, 2019

(87) PCT Pub. No.: WO2018/113576
PCT Pub. Date: Jun. 28, 2018

(65) Prior Publication Data
US 2019/0370759 A1 Dec. 5, 2019

(30) Foreign Application Priority Data
Dec. 21, 2016 (CN) .......................... 201611186701.4

(51) Int. Cl.
*G06K 5/00* (2006.01)
*G06Q 20/04* (2012.01)
(Continued)

(52) U.S. Cl.
CPC ......... *G06Q 20/0457* (2013.01); *G06Q 10/02* (2013.01); *G07C 9/22* (2020.01)

(58) Field of Classification Search
CPC .... G06K 19/00; G07G 1/0045; G07G 1/0081; G05Q 20/206
(Continued)

(56) References Cited

U.S. PATENT DOCUMENTS 5,948,040 A * 9/1999 DeLorme ............... G01C 21/36
340/990
6,032,260 A 2/2000 Sasmazel et al.
(Continued)

FOREIGN PATENT DOCUMENTS

CN 103824219 * 5/2014 ............. G06Q 10/02
CN 103824219 A 5/2014
(Continued)

OTHER PUBLICATIONS

CN 201310272477 translation from IP.com. Published Jan. 14, 2015. (Year: 2013).*
(Continued)

*Primary Examiner* — Daniel St Cyr
(74) *Attorney, Agent, or Firm* — James J. DeCarlo; Greenberg Traurig LLP (57) ABSTRACT

The disclosed embodiments provide methods and systems for verifying a ticket at a client. One method comprises: sending a request for an electronic ticket verification interface to a server, the request including identification information of at least one purchased electronic ticket; receiving response information returned when the server determines by parsing and verification that electronic ticket information included in the request meets a ticket verification condition, and displaying, in a corresponding display box, an electronic ticket verification interface invoked by an electronic ticket
(Continued)

verification interface invoking instruction included by the response information; and sending password input information collected on the verification interface to the server within a limit of password input times, and receiving ticket verification prompt information returned by the server in response to the password input information.

18 Claims, 8 Drawing Sheets

(51) Int. Cl.
*G06Q 10/02* (2012.01)
*G07C 9/22* (2020.01)

(58) Field of Classification Search
USPC .............. 235/382, 383, 380, 462.46, 472.02
See application file for complete search history.

(56) References Cited

U.S. PATENT DOCUMENTS

| | | | |
|---|---|---|---|
| 6,494,967 B1 | 12/2002 | Makita et al. | |
| 7,062,471 B1 | 6/2006 | Matsuyama et al. | |
| 7,305,478 B2 | 12/2007 | Willins et al. | |
| 7,325,132 B2 | 1/2008 | Takayama et al. | |
| 7,333,946 B1* | 2/2008 | Sipponen | G06Q 10/02 |
| | | | 705/26.35 |
| 7,555,460 B1* | 6/2009 | Barkan | G06Q 20/06 |
| | | | 235/492 |
| 7,841,525 B1* | 11/2010 | Zhou | G06Q 20/045 |
| | | | 235/382 |
| 8,176,064 B2* | 5/2012 | Huomo | G06Q 20/045 |
| | | | 235/375 |
| 8,494,967 B2* | 7/2013 | Bergdale | G06Q 20/0457 |
| | | | 705/65 |
| 8,870,089 B2 | 10/2014 | Gibson et al. | |
| 8,892,453 B2 | 11/2014 | Nakamura et al. | |
| 9,037,513 B2 | 5/2015 | Rosenblatt et al. | |
| 9,367,835 B2 | 6/2016 | Nelson et al. | |
| 9,881,433 B2 | 1/2018 | Bergdale et al. | |
| 10,102,509 B2 | 10/2018 | Arceneaux | |
| 10,121,318 B2 | 11/2018 | LeMay et al. | |
| 2012/0296826 A1 | 11/2012 | Bergdale et al. | |
| 2012/0296828 A1* | 11/2012 | Bergdale | G06Q 20/0457 |
| | | | 705/65 |
| 2013/0065667 A1 | 3/2013 | Nelson et al. | |
| 2013/0065668 A1 | 3/2013 | LeMay et al. | |
| 2013/0325523 A1* | 12/2013 | Huang | G06Q 10/02 |
| | | | 705/5 |
| 2015/0084741 A1* | 3/2015 | Bergdale | G07C 9/29 |
| | | | 340/5.61 |
| 2015/0294515 A1 | 10/2015 | Bergdale et al. | |
| 2016/0182971 A1* | 6/2016 | Ortiz | H04N 21/42224 |
| | | | 725/34 |
| 2017/0054832 A1* | 2/2017 | Awad | G06Q 20/045 |

FOREIGN PATENT DOCUMENTS

| | | | |
|---|---|---|---|
| CN | 104282091 A | 1/2015 | |
| CN | 106169192 | * 11/2016 | ............. G06Q 20/04 |
| CN | 106169192 A | 11/2016 | |
| CN | 106600717 A | 4/2017 | |
| CN | 106780781 A | 5/2017 | |

OTHER PUBLICATIONS

International Search Report to corresponding International Application No. PCT/CN2017/116092, dated Mar. 14, 2018 (3 pages).

* cited by examiner

METHODS, DEVICES, AND SYSTEMS FOR VERIFYING DIGITAL TICKETS AT A CLIENT

CROSS-REFERENCE TO RELATED APPLICATION

This application is a national stage entry and claims the benefit of priority of International Application No. PCT/CN2017/116092, filed Dec. 14, 2017 and entitled "METHOD AND SYSTEM FOR CHECKING TICK ON CLIENT, AND SMART DEVICE" which claims the benefit of priority of Chinese Application No. 201611186701.4, filed on Dec. 21, 2016 and entitled "METHOD AND SYSTEM FOR CHECKING TICK ON CLIENT, AND SMART DEVICE", both of which are hereby incorporated by reference in their entirety.

BACKGROUND

Technical Field

The disclosed embodiments relate to the field of ticket verification technologies and, in particular, to methods and systems for verifying a ticket at a client or smart device.

Description of the Related Art

Currently, there mainly exist two forms of ticket verification. The first form is that a user holds a purchased paper ticket, and on-site staff scan and verify the ticket via a computing device. The second form is that a user uses an electronic ticket marked with a dynamic two-dimensional code for a ticket, and on-site staff scan and verify the ticket via a computing device.

These two forms of ticket verification have at least the following disadvantages. For the first form of ticket verification, because the object to be verified is a paper ticket, a duplicate ticket generated by copying cannot be distinguished by verification, and authenticity of a defaced ticket cannot be identified. For the second form of ticket verification, although uniqueness of the ticket can be guaranteed by encryption, a specific ticket verification device is required (including but not limited to a hand-held PDA, a gate, etc.) and deployment of devices and networking will greatly increase costs.

With the popularity of mobile phones and networks, the mobile office has become an irreversible trend, and as is the case for ticket verification in the ticketing industry.

If a user's mobile phone is combined with ticket verification, on the premise of ensuring uniqueness of a ticket, it supports on-site staff to verify the ticket by using the user's mobile phone, which can reduce costs of deploying devices and networking.

SUMMARY

To achieve the above objectives, the disclosed embodiments provide methods and systems for verifying a ticket at a client and a smart device. On the premise of ensuring ticket verification, costs of ticket verification device deployment and networking are reduced, and by providing a function of printing a receipt (an entry credential or a seat credential) by network connection after successful ticket verification, the problem of illegal entry through ticket verification by counterfeiting (or simulating) a graphical password is eliminated.

To achieve the above objective, the disclosed embodiments provide a method for verifying a ticket at a client, including: sending a request for an electronic ticket verification interface to a server, the request including identification information of at least one purchased electronic ticket; receiving response information returned when the server determines by parsing and verification that electronic ticket information included in the request meets a ticket verification condition, and displaying, in a corresponding display box, an electronic ticket verification interface invoked by an electronic ticket verification interface invoking instruction included by the response information; and sending password input information collected on the verification interface to the server within a limit of password input times, and receiving ticket verification prompt information returned by the server in response to the password input information.

Further, after the request to a server within a limit of password input times, the method further includes: receiving response information returned when the server determines by parsing and verification that the electronic ticket information included in the request does not meet the ticket verification condition, the response information including an instruction not to invoke the electronic ticket verification interface; and displaying, in a corresponding display box, ticket verification failure prompt information included in the response information, and ending a ticket verification process.

Further, the displaying, in a corresponding display box, ticket verification failure prompt information included in the response information, and ending a ticket verification process includes: ending the ticket verification process when the ticket verification failure prompt information included in the response information displayed in the corresponding display box indicates that the electronic ticket does not exist; or ending the ticket verification process when the electronic ticket exists but the ticket verification failure prompt information included in the response information displayed in the corresponding display box indicates that an item session corresponding to the electronic ticket information does not exist in a ticket verification plan; or ending the ticket verification process when the item session corresponding to the electronic ticket information is in the ticket verification plan but the ticket verification failure prompt information included in the response information displayed in the corresponding display box indicates that ticket verification for the item session corresponding to the electronic ticket information has ended; or ending the ticket verification process when the item session corresponding to the electronic ticket information is within the ticket verification period but the ticket verification failure prompt information included in the response information displayed in the corresponding display box indicates that a ticket status corresponding to electronic ticket credential information does not meet the ticket verification condition.

Further, the ticket status corresponding to electronic ticket credential information not meeting the ticket verification condition includes but is not limited to: the ticket status is one of a validated ticket, an exchanged ticket, a refunded ticket, or an invalid ticket.

Further, the electronic ticket information meeting the ticket verification condition includes: the ticket status is an unverified ticket, an unexchanged ticket, and a ticket within the ticket verification period.

Further, the displaying, in a corresponding display box, an electronic ticket verification interface invoked by an electronic ticket verification interface invoking instruction included by the response information includes: displaying, in the corresponding display box, a ticket verification countdown interface of the session corresponding to the electronic ticket included by the response information, for which the server determines that current time is earlier than ticket verification time, deleting the ticket verification countdown interface after the countdown ends, and displaying the verification interface corresponding to the electronic ticket in the same display box; or displaying, in the corresponding display box, the electronic ticket verification interface invoked by the electronic ticket verification interface invoking instruction included by the response information when the server determines that the current time is within the ticket verification time.

Further, the sending password input information collected on the verification interface to the server within a limit of password input times includes: receiving a gesture touch screen switching instruction and switching at least one password collection interface of the verification interface according to the switching instruction; and binding and encrypting the password input information collected on the at least one password collection interface and the electronic ticket identification information; and sending the encrypted password input information to the server within the limit of password input times.

Further, the receiving ticket verification prompt information returned by the server in response to the password input information includes: receiving password error prompt information returned by the server in response to the password input information, and sending password input information collected on the verification interface to the server again within the limit of password input times, and locking the verification interface upon receiving prompt information that is returned by the server in response to the password input information and indicates that a number of password errors reaches a maximum value; or receiving ticket verification success prompt information returned by the server in response to the password input information, and receiving ticket verification status information of the electronic ticket.

Further, the method further comprises: displaying prompt information for obtaining a paper print file of the electronic ticket when the ticket verification prompt information sent by the server is ticket verification success prompt information.

The disclosed embodiments further provide a system for verifying a ticket at a client, including: a first sending module, configured to send a request for an electronic ticket verification interface to a server, the request including identification information of at least one purchased electronic ticket; a first receiving module, configured to receive response information returned when the server determines by parsing and verification that electronic ticket information included in the request meets a ticket verification condition, and display, in a corresponding display box, an electronic ticket verification interface invoked by an electronic ticket verification interface invoking instruction included by the response information; a second sending module, configured to send password input information collected on the verification interface to the server within a limit of password input times; and a second receiving module, configured to receive ticket verification prompt information returned by the server in response to the password input information.

Further, the method also comprises: a third receiving module, configured to receive response information returned when the server determines by parsing and verification that the electronic ticket information included in the request does not meet the ticket verification condition, the response information including an instruction not to invoke the electronic ticket verification interface; and a first display module, configured to display, in a corresponding display box, ticket verification failure prompt information included in the response information, and end a ticket verification process.

Further, the first display module includes: a first display unit, configured to end the ticket verification process when the ticket verification failure prompt information included in the response information displayed in the corresponding display box indicates that the electronic ticket does not exist; or a second display unit, configured to end the ticket verification process when the electronic ticket exists but the ticket verification failure prompt information included in the response information displayed in the corresponding display box indicates that an item session corresponding to the electronic ticket information does not exist in a ticket verification plan; or a third display unit, configured to end the ticket verification process when the item session corresponding to the electronic ticket information is in the ticket verification plan but the ticket verification failure prompt information included in the response information displayed in the corresponding display box indicates that ticket verification for the item session corresponding to the electronic ticket information has ended; or a fourth display unit, configured to end the ticket verification process when the item session corresponding to the electronic ticket information is within a ticket verification period but the ticket verification failure prompt information included in the response information displayed in the corresponding display box indicates that a ticket status corresponding to electronic ticket credential information does not meet the ticket verification condition.

Further, the ticket status corresponding to electronic ticket credential information not meeting the ticket verification condition includes but is not limited to: the ticket status is one of a validated ticket, an exchanged ticket, a refunded ticket, or an invalid ticket.

Further, the electronic ticket information meeting the ticket verification condition includes: the ticket status is an unverified ticket, an unexchanged ticket, and a ticket within the ticket verification period.

Further, the first receiving module includes: a first receiving unit, configured to display, in the corresponding display box, a ticket verification countdown interface of the session corresponding to the electronic ticket included by the response information, for which the server determines that current time is earlier than ticket verification time, delete the ticket verification countdown interface after the countdown ends, and display the verification interface corresponding to the electronic ticket in the same display box; or a second display module, configured to display, in the corresponding display box, the electronic ticket verification interface invoked by the electronic ticket verification interface invoking instruction included by the response information when the server determines that the current time is within the ticket verification time.

Further, the second sending module includes: a switching unit, configured to receive a gesture touch screen switching instruction and switch at least one password collection interface of the verification interface according to the switching instruction; an encryption unit, configured to bind and encrypt the password input information collected on the at least one password collection interface and the electronic ticket identification information; and a first sending unit, configured to send the encrypted password input information to the server within the limit of password input times.

Further, the second receiving module includes: a second receiving unit, configured to receive password error prompt information returned by the server in response to the password input information, and send password input information collected on the verification interface to the server again within the limit of password input times, and lock the verification interface upon receiving prompt information that is returned by the server in response to the password input information and indicates that a number of password errors reaches a maximum value; or a third receiving unit, configured to receive ticket verification success prompt information returned by the server in response to the password input information, and receive ticket verification status information of the electronic ticket.

Further, the system further includes: a display module, configured to display prompt information for obtaining a paper print file of the electronic ticket when the ticket verification prompt information sent by the server is ticket verification success prompt information.

The disclosed embodiments further provide a smart device, including the system of any of the preceding items.

The disclosed embodiments include sending a request for an electronic ticket verification interface to a server, the request including identification information of at least one purchased electronic ticket; receiving response information returned when the server determines by parsing and verification that electronic ticket information included in the request meets a ticket verification condition, and displaying, in a corresponding display box, an electronic ticket verification interface invoked by an electronic ticket verification interface invoking instruction included by the response information; and sending password input information collected on the verification interface to the server within a limit of password input times, and receiving ticket verification prompt information returned by the server in response to the password input information. On the premise of ensuring ticket verification, costs of ticket verification device deployment and networking are reduced, and by providing a function of printing a receipt (an entry credential or a seat credential) by network connection after successful ticket verification, the problem of illegal entry through ticket verification by counterfeiting (or simulating) a graphical password is eliminated.

DETAILED DESCRIPTION OF THE EMBODIMENTS

To enable a person skilled in the art to better understand solutions of the disclosed embodiments, the technical solutions in the disclosed embodiments are described clearly and completely below with reference to the drawings. The described embodiments are merely some, rather than all of the embodiments. On the basis of the embodiments, all other embodiments obtained by those of ordinary skill in the art without making creative efforts shall fall within the scope of the disclosure.

The terms "first", "second", and the like in the description, claims, and drawings are used to distinguish similar objects and are not necessarily used to describe a specific sequence or order. Such numbers may be interchanged where appropriate so that the disclosed embodiments can be implemented in orders other than those illustrated or described herein. In addition, the terms "include" and "have" and any variations thereof are intended to cover non-exclusive inclusions. For example, processes, methods, systems, products, or apparatuses that comprise a series of steps or units are not limited to steps or units that are clearly listed, but may include other steps or units not clearly listed or inherent to these processes, methods, products, or devices.

Figure 1:
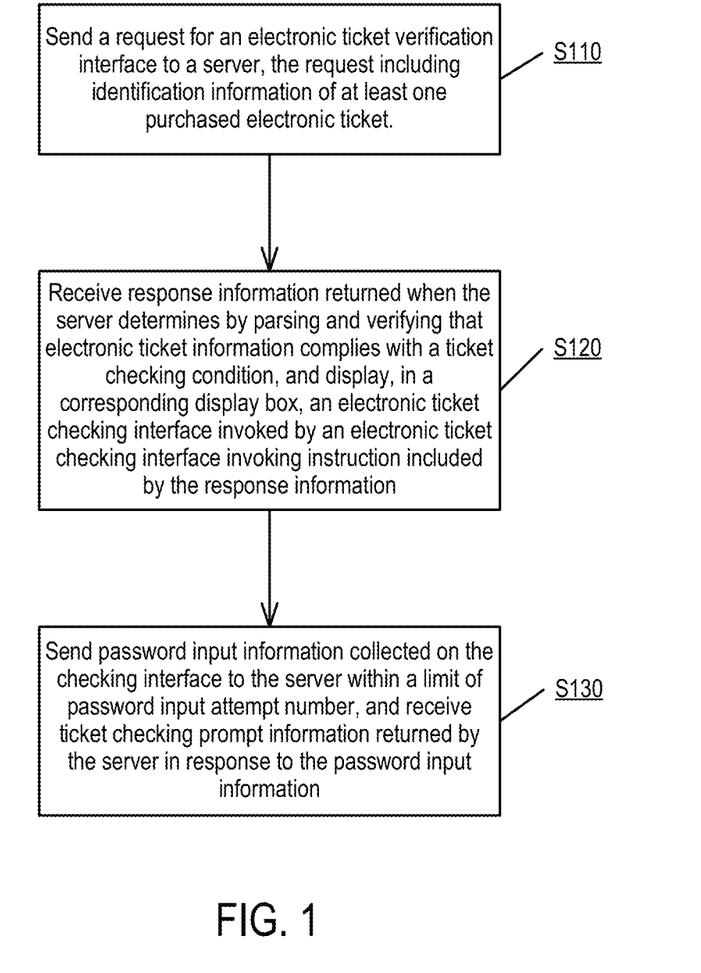
FIG. 1 is a flow diagram illustrating a method for verifying a ticket at a client according to some embodiments of the disclosure.

FIG. 1 is a flow diagram illustrating a method for verifying a ticket at a client according to some embodiments of the disclosure. The method includes steps S110 to S130.

Step S110: Send a request for an electronic ticket verification interface to a server, the request including identification information of at least one purchased electronic ticket.

In step S110, the client sends the request for an electronic ticket verification interface to the server through, for example, a mobile web page (such as an H5 web page), an Android® local application interface, or an iOS® local application interface. The at least one purchased electronic ticket indicates that the at least one electronic ticket is owned by a user through direct purchase, or by way of transfer, gift, or the like.

Further, after the sending the request for an electronic ticket verification interface to a server, the method according to one embodiment further includes the following steps S210 and S220.

Step S210: Receive response information returned when the server determines (by parsing and verification) that electronic ticket information included in the request for the electronic ticket verification interface does not meet a ticket verification condition, the response information including an instruction not to invoke the electronic ticket verification interface.

Step S220: Display, in a corresponding display box, ticket verification failure prompt information included in the response information, and end a ticket verification process.

The corresponding display box refers to a display area that is set to display the prompt information, and the display area may be on a main interface of an application or on a pop-up window.

Further, in step S220, the displaying, in a corresponding display box, ticket verification failure prompt information included in the response information, and ending a ticket verification process may include at least one of the following methods:

1. Method 1: ending the ticket verification process when the ticket verification failure prompt information included in the response information displayed in the corresponding display box indicates that the electronic ticket does not exist;
2. Method 2: ending the ticket verification process when the electronic ticket exists but the ticket verification failure prompt information included in the response information displayed in the corresponding display box indicates that an item session corresponding to the electronic ticket information does not exist in a ticket verification plan;

3. Method 3: ending the ticket verification process when the item session corresponding to the electronic ticket information is in the ticket verification plan but the ticket verification failure prompt information included in the response information displayed in the corresponding display box indicates that ticket verification for the item session corresponding to the electronic ticket information has ended; or 4. Method 4: ending the ticket verification process when the item session corresponding to the electronic ticket information is within a ticket verification period but the ticket verification failure prompt information included in the response information displayed in the corresponding display box indicates that a ticket status corresponding to electronic ticket credential information does not meet the ticket verification condition.

Further, the ticket status corresponding to electronic ticket credential information not meeting the ticket verification condition includes but is not limited to: the ticket status is one of a validated ticket, an exchanged ticket, a refunded ticket, or an invalid ticket.

Step S120: Receive response information returned when the server determines (by parsing and verification) that electronic ticket information included in the request for the electronic ticket verification interface meets a ticket verification condition, and display, in a corresponding display box, an electronic ticket verification interface invoked by an electronic ticket verification interface invoking instruction included by the response information.

Further, the electronic ticket information meeting the ticket verification condition includes, for example, the ticket status is an unverified ticket, an unexchanged ticket, and a ticket within the ticket verification period.

Further, the displaying, in a corresponding display box, an electronic ticket verification interface invoked by an electronic ticket verification interface invoking instruction included by the response information may include at least one of the following methods:

1. Method 1: displaying, in the corresponding display box, a ticket verification countdown interface of the session corresponding to the electronic ticket included by the response information, for which the server determines that current time is earlier than ticket verification time, deleting the ticket verification countdown interface after the countdown ends, and displaying the verification interface corresponding to the electronic ticket in the same display box; or 2. Method 2: displaying, in the corresponding display box, the electronic ticket verification interface invoked by the electronic ticket verification interface invoking instruction included by the response information when the server determines that the current time is within the ticket verification time.

Step S130: Send password input information collected on the verification interface to the server within a limit of password input times, and receive ticket verification prompt information returned by the server in response to the password input information. Further, in step S130, the sending password input information collected on the verification interface to the server within a limit of password input times may include the following steps S131 and S132.

Step S131: Receive a gesture touch screen switching instruction and switch at least one password collection interface of the verification interface according to the switching instruction.

Step S132: Bind and encrypt the password input information collected on the at least one password collection interface and the electronic ticket identification information and send the encrypted password input information to the server within the limit of password input times.

The password input information includes but is not limited to one or more of graphic password input information, digital password input information, fingerprint password input information, and face recognition password input information.

Scientific research shows that human ability to remember words is quite limited, but the ability to remember graphic images is significantly better than the ability to remember words. In addition, humans remember words and images in different ways. Currently, many scholars are devoted to the research of graphic ciphers, which have been applied to personal digital assistants (PDAs), automated teller machines (ATMs), and the like. Although many of these models are only in theoretical research and experimental stages and have not been put into practical commercial use, they have a very broad space for development because they are highly secure and interesting in use. Graphical passwords have appeared for the above reasons. Graphical cryptography is a new type of cryptosystem that uses graphics and the like as a medium. During identity authentication of users, they need to perform certain operations on these graphics. Due to a large password space, flexible application mode, and no use of words, the graphic passwords are immune to brute force and dictionary attacks. In addition, some graphic cryptosystems can completely prevent shoulder surfing. Embodiments of the invention preferably use a graphical password for verification.

Passwords of electronic tickets are stored in an information storage module in a server database. In a process of verifying a ticket, staff manually input a password on the verification interface of the client to verify the ticket, and the authenticity of the electronic ticket is ensured because the password is not leaked.

Further, in step S130, the receiving ticket verification prompt information returned by the server in response to the password input information may include at least one of the following methods.

1. Method 1: receiving password error prompt information returned by the server in response to the password input information, and sending password input information collected on the verification interface to the server again within the limit of password input times, and locking the verification interface upon receiving prompt information that is returned by the server in response to the password input information and indicates that a number of password errors reaches a maximum value; or 2. Method 2: receiving ticket verification success prompt information returned by the server in response to the password input information, and receiving ticket verification status information of the electronic ticket.

Further, in some embodiments, the method may further include displaying prompt information for obtaining a paper print file of the electronic ticket when the ticket verification prompt information sent by the server is ticket verification success prompt information.

The prompt information for obtaining the paper print file of the electronic ticket includes but is not limited to "Print succeeded", "Print failed", "Please take the receipt" and the like.

By providing a function of printing a receipt (an entry credential or a seat credential) by network connection, the problem of illegal entry through ticket verification by counterfeiting (or simulating) a graphical password is eliminated.

In summary, the aforementioned embodiments include sending a request for an electronic ticket verification interface to a server, the request including identification information of at least one purchased electronic ticket; receiving response information returned when the server determines (by parsing and verification) that the electronic ticket information included in the request for the electronic ticket verification interface meets a ticket verification condition, and displaying, in a corresponding display box, an electronic ticket verification interface invoked by an electronic ticket verification interface invoking instruction included by the response information; and sending password input information collected on the verification interface to the server within a limit of password input times, and receiving ticket verification prompt information returned by the server in response to the password input information. On the premise of ensuring ticket verification, costs of ticket verification device deployment and networking are reduced, and by providing a function of printing a receipt (an entry credential or a seat credential) by network connection after successful ticket verification, the problem of illegal entry through ticket verification by counterfeiting (or simulating) a graphical password is eliminated.

Figure 2:
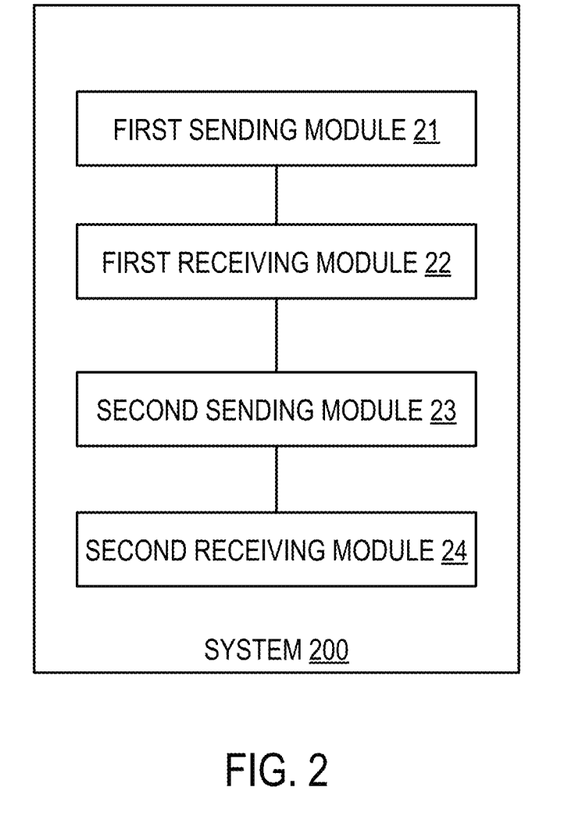
FIG. 2 is a block diagram of a system for verifying a ticket at a client according to some embodiments of the disclosure.

FIG. 2 is a block diagram of a system 200 for verifying a ticket at a client according to some embodiments of the disclosure, that includes a first sending module 21, a first receiving module 22, a second sending module 23, and a second receiving module 24.

The first sending module 21 is configured to send a request for an electronic ticket verification interface to a server, the request including identification information of at least one purchased electronic ticket.

The first receiving module 22 is configured to receive response information returned when the server determines (by parsing and verification) that electronic ticket information included in the request for the electronic ticket verification interface meets a ticket verification condition, and display, in a corresponding display box, an electronic ticket verification interface invoked by an electronic ticket verification interface invoking instruction included by the response information.

The second sending module 23 is configured to send password input information collected on the verification interface to the server within a limit of password input times.

The second receiving module 24 is configured to receive ticket verification prompt information returned by the server in response to the password input information.

Figure 3:
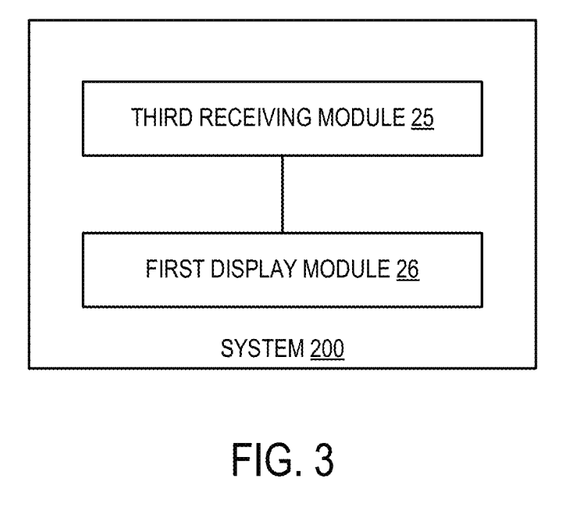
FIG. 3 is a block diagram of a system for verifying a ticket at a client according to some embodiments of the disclosure.

Further, referring to FIG. 3, in some embodiments the system 200 may further include a third receiving module 25 and a first display module 26.

The third receiving module 25 is configured to receive response information returned when the server determines (by parsing and verification) that the electronic ticket information included in the request for the electronic ticket verification interface does not meet the ticket verification condition, the response information including an instruction not to invoke the electronic ticket verification interface.

The first display module 26 is configured to display, in a corresponding display box, ticket verification failure prompt information included in the response information, and end a ticket verification process.

Figure 4:
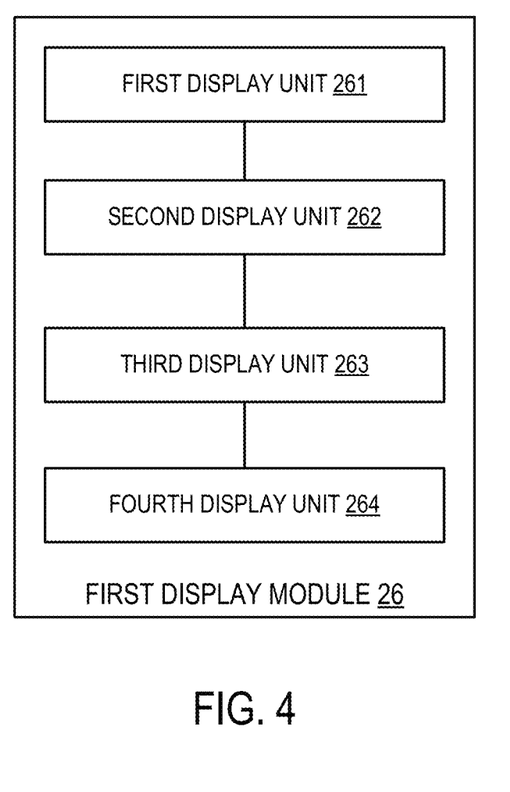
FIG. 4 is a block diagram of a first display module according to some embodiments of the disclosure.

Further, referring to FIG. 4, in some embodiments the first display module 26 may include at least one of a first display unit 261, a second display unit 262, a third display unit 263, and a fourth display unit 264.

The first display unit 261 is configured to end the ticket verification process when the ticket verification failure prompt information included in the response information displayed in the corresponding display box indicates that the electronic ticket does not exist.

The second display unit 262 is configured to end the ticket verification process when the electronic ticket exists but the ticket verification failure prompt information included in the response information displayed in the corresponding display box indicates that an item session corresponding to the electronic ticket information does not exist in a ticket verification plan.

The third display unit 263 is configured to end the ticket verification process when the item session corresponding to the electronic ticket information is in the ticket verification plan but the ticket verification failure prompt information included in the response information displayed in the corresponding display box indicates that ticket verification for the item session corresponding to the electronic ticket information has ended.

The fourth display unit 264 is configured to end the ticket verification process when the item session corresponding to the electronic ticket information is within a ticket verification period but the ticket verification failure prompt information included in the response information displayed in the corresponding display box indicates that a ticket status corresponding to electronic ticket credential information does not meet the ticket verification condition.

Further, the ticket status corresponding to electronic ticket credential information not meeting the ticket verification condition includes but is not limited to: the ticket status is one of a validated ticket, an exchanged ticket, a refunded ticket, or an invalid ticket.

Further, the electronic ticket information meeting the ticket verification condition includes: the ticket status is an unverified ticket, an unexchanged ticket, and a ticket within the ticket verification period.

Figure 5:
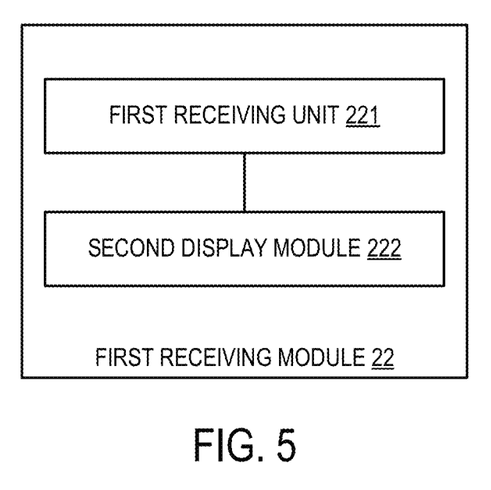
FIG. 5 is a block diagram of a first receiving module according to some embodiments of the disclosure.

Further, referring to FIG. 5, in some embodiments the first receiving module 22 may include a first receiving unit 221 or a second display module 222.

The first receiving unit 221 is configured to display, in the corresponding display box, a ticket verification countdown interface of the session corresponding to the electronic ticket included by the response information and determined by the server that current time is earlier than ticket verification time, delete the ticket verification countdown interface after the countdown ends, and display the verification interface corresponding to the electronic ticket in the same display box; or the second display module 222 is configured to display, in the corresponding display box, the electronic ticket verification interface invoked by the electronic ticket verification interface invoking instruction included by the response information when the server determines that the current time is within the ticket verification time.

Figure 6:
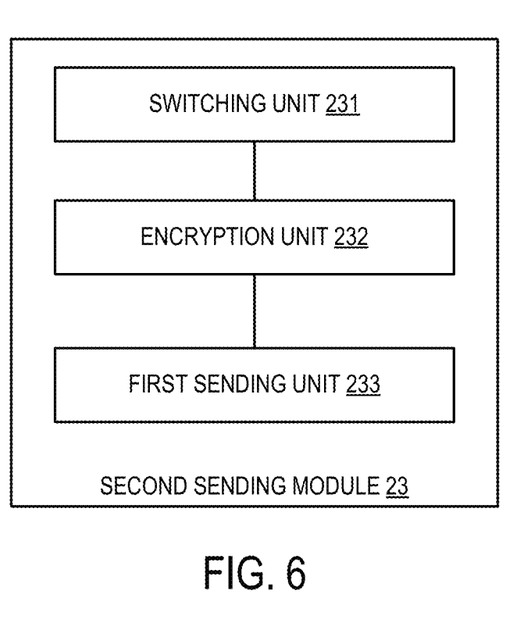
FIG. 6 is a block diagram of a second sending module according to some embodiments of the disclosure.

Further, referring to FIG. 6, in some embodiments the second sending module 23 may include a switching unit 231, an encryption unit 232, and a first sending unit 233.

The switching unit 231 is configured to receive a gesture touch screen switching instruction and switch at least one password collection interface of the verification interface according to the switching instruction.

The encryption unit 232 is configured to bind and encrypt the password input information collected on the at least one password collection interface and the electronic ticket identification information.

The first sending unit 233 is configured to send encrypted password input information to the server within the limit of password input times.

Figure 7:
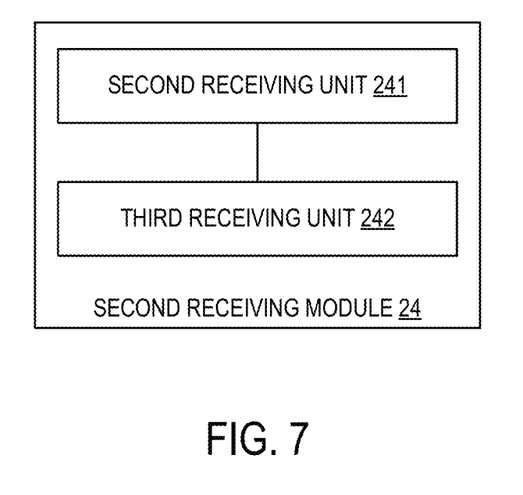
FIG. 7 is a block diagram of a second receiving module according to some embodiments of the disclosure.

Further, referring to FIG. 7, in some embodiments the second receiving module 24 may include a second receiving unit 241 or a third receiving unit 242.

The second receiving unit 241 is configured to receive password error prompt information returned by the server in response to the password input information, and send password input information collected on the verification interface to the server again within the limit of password input times, and lock the verification interface upon receiving prompt information that is returned by the server in response to the password input information and indicates that a number of password errors reaches a maximum value.

The third receiving unit 242 is configured to receive ticket verification success prompt information returned by the server in response to the password input information, and receive ticket verification status information of the electronic ticket.

Further, in some embodiments the system may further include a display module (not shown).

The display module is configured to display prompt information for obtaining a paper print file of the electronic ticket when the ticket verification prompt information sent by the server is ticket verification success prompt information.

By providing a function of printing a receipt (an entry credential or a seat credential) by network connection, the problem of illegal entry through ticket verification by counterfeiting (or simulating) a graphical password is eliminated.

The processes and functions implemented by the system illustrates in FIGS. 2 through 7 substantially correspond to the embodiments, principles, and examples of the method discussed in the description of FIG. 1. Therefore, for a detailed description of the embodiments, reference may be made to the related description in the foregoing embodiment, and details are not described herein again.

The embodiments discussed in the description of FIGS. 2 through 7 include sending, by a first sending module, a request for an electronic ticket verification interface to a server, the request including identification information of at least one purchased electronic ticket; receiving, by a first receiving module, response information returned when the server determines (by parsing and verification) that the electronic ticket information included in the request for the electronic ticket verification interface meets a ticket verification condition, and displaying, in a corresponding display box, an electronic ticket verification interface invoked by an electronic ticket verification interface invoking instruction included by the response information; sending, by a second sending module, password input information collected on the verification interface to the server within a limit of password input times, and receiving, by a second receiving module, ticket verification prompt information returned by the server in response to the password input information. On the premise of ensuring ticket verification, costs of ticket verification device deployment and networking are reduced, and by providing a function of printing a receipt (an entry credential or a seat credential) by network connection after successful ticket verification, the problem of illegal entry through ticket verification by counterfeiting (or simulating) a graphical password is eliminated.

Figure 8:
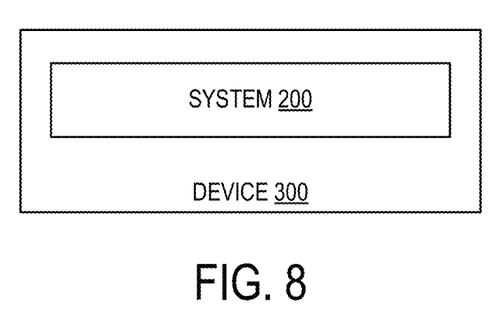
FIG. 8 is a block diagram of a smart device according to some embodiments of the disclosure.

Referring to FIG. 8, in some embodiments a smart device 300 is shown, which includes a system 200 according to any item described in FIGS. 2 through 7.

Further, the smart device includes, but is not limited to a smart terminal that uses an H5 web page application interface, an Android® local application interface, an iOS® local application interface, and that can be connected to the network.

The smart device 300 may include a memory and a processor.

The processor can be a center processing unit CPU, a microprocessor MCU and so on.

For example, the memory includes ROM (Read Only Memory), RAM (Random Access Memory), a nonvolatile memory such as a hard disk, or the like.

The memory is used to store instructions for controlling operation of the processor to perform a method for verifying a ticket according to one embodiment.

The smart device 300 may further include an interface apparatus, a communication apparatus, an input apparatus, a speaker, a microphone, and so on.

The interface apparatus includes, for example, a USB interface, headphone interface, and so on. The communication apparatus can, for example, be capable of performing wired or wireless communication, specifically, Wi-Fi communication, Bluetooth communication, 2G/3G/4G/5G communications, and so on. The input apparatus may include, for example, a touch screen, a keyboard, somatosensory input or the like. A user can input/output voice information through the speaker and microphone.

The mobile terminal illustrated in FIG. 8 sends a request for an electronic ticket verification interface to a server, the request including identification information of at least one purchased electronic ticket; receives response information returned when the server determines (by parsing and verification) that the electronic ticket information included in the request for the electronic ticket verification interface meets a ticket verification condition, and displays, in a corresponding display box, an electronic ticket verification interface invoked by an electronic ticket verification interface invoking instruction included by the response information; and sends password input information collected on the verification interface to the server within a limit of password input times, and receives ticket verification prompt information returned by the server in response to the password input information. On the premise of ensuring ticket verification, costs of ticket verification device deployment and networking are reduced, and by providing a function of printing a receipt (an entry credential or a seat credential) by network connection after successful ticket verification, the problem of illegal entry through ticket verification by counterfeiting (or simulating) a graphical password is eliminated.

The sequence numbers of the foregoing embodiments are merely for description and do not indicate advantages or disadvantages of the embodiments.

It should be noted that to briefly describe each foregoing method embodiments, all the method embodiments are expressed as a combination of a series of actions; but those skilled in the art should know that the methods are not limited by the sequence of the described actions; certain steps can be applied with different sequences or can be included out at the same time.

In the embodiments, the description of each embodiment has its own focus; and references for those that are not described in detail in a certain embodiment can be made by referring to the related descriptions of other embodiments.

In the several embodiments provided by the present application, the disclosed apparatus can be implemented in other manners. For example, the apparatus embodiment described above is merely illustrative. For example, the division of the units is merely a logical function division; other division methods in practical implementation may exist, like a plurality of units or components can be combined or can be integrated into another system; or some features can be ignored or are not executed. Additionally, the intercoupling, direct coupling, or communication connection displayed or discussed may be electrical, mechanical, or other forms through some interfaces, indirect coupling or communication connection of the device or the units.

The units described as separate parts may or may not be physically separated; and the parts shown as units may or may not be physical units, which may be in one place or may be distributed onto a plurality of network units. The objective of the solution of this embodiment may be achieved by selecting part or all the units according to actual requirements.

In addition, each functional unit in each embodiment may be integrated in one processing unit, or each unit may exist physically independently, or two or more units may be integrated in one unit. The integrated unit may be implemented in the form of hardware, and may also be implemented in the form of a software functional unit.

It should be noted that depending on needs for implementation, each step/component described in the present application can be split into additional steps/components, or two or more steps/components or parts of the steps/components can be combined into new steps/components to achieve the objectives of the disclosure.

The invention may be an apparatus, a method, and/or a computer program product. The computer program product may include a computer-readable storage medium having computer readable program instructions thereon for causing a processor to implement various aspects of the disclosed embodiments.

The above method according to the invention may be implemented in hardware or firmware, or implemented as software or computer code that can be stored in a recording medium (such as a CD ROM, a RAM, a floppy disk, a hard disk, or an optical disc), or implemented as computer code downloaded over a network, originally stored in a remote recording medium or a non-transitory machine readable medium, and to be stored in a local recording medium. Thus, the method described herein can be processed by software stored in a recording medium used in a general-purpose computer, a special-purpose processor, or programmable or special-purpose hardware such as an ASIC or an FPGA. It will be appreciated that a computer, a processor, a microprocessor controller, or programmable hardware includes storage components (e.g., a RAM, a ROM, a flash memory, etc.) that can store or receive software or computer code. The processing methods described herein are implemented when the software or computer code is accessed and executed by the computer, the processor, or the hardware. Moreover, when a general-purpose computer accesses the code for implementing the processing shown herein, the execution of the code converts the general-purpose computer into a special-purpose computer for performing the processing shown herein.

The computer-readable storage medium may be a physical device that can maintain and store instructions used by an instruction execution device. The computer-readable storage medium may be, for example, but is not limited to an electrical storage device, a magnetic storage device, an optical storage device, an electromagnetic storage device, a semiconductor memory device, or any suitable combination thereof. More specific examples of the computer readable storage medium (a non-exhaustive list) include: a portable computer disk, a hard disk, a random access memory (RAM), a read only memory (ROM), a erasable programmable read only memory (EPROM or flash memory), a static random access memory (SRAM), a portable compact disc read-only memory (CD ROM), a digital versatile disk (DVD), a memory stick, a floppy disk, a mechanical coding equipment, such as a punch card with instructions stored thereon or a structure of bumps within recessions, and any suitable combination thereof. The computer readable storage medium used herein should not be interpreted as a transient signal itself, such as a radio wave or other freely propagating electromagnetic waves, an electromagnetic wave propagating through a waveguide or other transmission media (e.g., a light pulse passing through an optical fiber), or an electrical signal passing through a wire.

The computer readable program instructions described herein may be downloaded from a computer-readable storage medium to various computing/processing devices or downloaded to an external computer or external storage device via a network such as the Internet, a local area network, a wide area network and/or a wireless network. The network may include copper transmission cables, fiber transmission, wireless transmission, routers, firewalls, switches, gateway computers, and/or edge servers. A network adapter card or a network interface in each computing/processing device receives computer-readable program instructions from the network and forwards the computer readable program instructions, for storing them in a computer readable storage medium in each computing/processing device.

Computer program instructions for performing the operations of the disclosed embodiments can be assembly instructions, instruction set architecture (ISA) instructions, machine instructions, machine related instructions, microcode, firmware instructions, state setting data, or source code or object code written in any combination of one or more programming languages, the programming language including object oriented programming languages such as Smalltalk, C++ and the like, and conventional procedural programming languages such as "C" language or similar programming languages. The computer readable program instructions can be executed entirely on a user's computer, partially executed on a user's computer, executed as an independent package, partially executed on the user's computer, and partially executed on the remote computer, or executed entirely on a remote computer or server. In the case of a remote computer, the remote computer may be connected to the user's computer through any kind of network, including a local area network (LAN) or a wide area network (WAN). Alternatively, it can be connected to an external computer (for example, using an Internet service provider to connect via the Internet). In some embodiments, electronic circuits, such as programmable logic circuits, field programmable gate arrays (FPGAs), or programmable logic arrays (PLAs), are customized by utilizing state information of computer readable program instructions. The electronic circuits can execute computer readable program instructions to implement various aspects of the disclosed embodiments.

The aspects of the disclosed embodiments are described herein with reference to the flowcharts and/or block diagrams of the methods, apparatuses (systems), and computer program products according to the embodiments. Each block of the flowcharts and/or block diagrams and combinations of various blocks in the flowcharts and/or block diagrams can be implemented by computer readable program instructions.

These computer program instructions may be provided to a processor of a general-purpose computer, a special-purpose computer, or other programmable data processing apparatuses, to produce a machine, so that these instructions, when executed by the processor of the computer or other programmable data processing apparatuses, produce an apparatus for implementing the functions/actions specified in one or more of the blocks of the flowcharts and/or block diagrams. Also, these computer readable program instructions may be stored in a computer readable storage medium. These instructions cause a computer, a programmable data processing device, and/or other devices to work in a specific manner; thus, the computer readable medium storing the instructions includes an artifact, including instructions that implement various aspects of the functions/actions specified in one or more of the flowcharts and/or block diagrams.

The computer program instructions may also be loaded onto a computer, other programmable data processing apparatuses, or other devices, such that the computer, other programmable data processing apparatuses or other devices perform a series of operational steps, to generate a computer-implemented process, such that the functions/actions specified in one or more of the flowcharts and/or block diagrams are implemented by the instructions executed on the computer, other programmable data processing apparatuses, or other devices.

The flowcharts and block diagrams in the accompanying drawings show possible architectures, functions and operations of the systems, methods, and computer program products according to the disclosed embodiments. Regarding this, each block in the flowcharts or block diagrams may represent a portion of a module, a program segment, or an instruction that contains one or more executable instructions for implementing a specified logical function. In some alternative implementations, the functions denoted in the blocks may also occur in a different order than those illustrated in the drawings. For example, two consecutive blocks may be executed substantially in parallel, and may be executed in a reverse order in some cases, depending upon functionality involved. It is also noted that each block of the block diagrams and/or flowcharts, and combinations of blocks in the block diagrams and/or flowcharts can be implemented in a dedicated hardware-based system that performs the specified function or action, or can be implemented by a combination of dedicated hardware and computer instructions. It is well known to those skilled in the art that implementation by hardware, implementation by software, and implementation by a combination of software and hardware are equivalent.

The above description is only specific embodiments, but the scope of the disclosure is not limited thereto, and variations or alternatives readily conceivable by those skilled in the art within the technical scope of the disclosure shall fall within the scope of the disclosure. Therefore, the scope of the disclosure should not be subject to the scope of the appended claims.

What is claimed is:

1. A method comprising:
    sending, by a client device, a request for an electronic ticket verification interface to a server, the request including identification information of at least one purchased electronic ticket;
    receiving, at the client device, response information from the server when the electronic ticket information meets a ticket verification condition, the response information including an electronic ticket verification interface invoking instruction;
    displaying, by the client device in a corresponding display box, an electronic ticket verification interface by invoking the electronic ticket verification interface invoking instruction, the electronic ticket verification interface displaying a prompt for password input information;
    receiving, by the client device, a touch screen switching instruction gesture;
    switching, by the client device, at least one password collection interface of the verification interface according to the gesture;
    receiving, at the client device, the password input information via the at least one password collection interface, the password input information collected within a limit of password input times;
    binding and encrypting, by the client device, the password input information collected via the at least one password collection interface and the electronic ticket identification information;
    sending, by the client device to the server, the password input information collected via the at least one password collection interface and the electronic ticket identification information; and
    receiving, at the client device, ticket verification prompt information returned by the server in response to the password input information.

2. The method of claim 1, wherein after sending the request for the electronic ticket verification interface to a server, the method further comprises:
    receiving, at the client device, response information from the server when the electronic ticket information does not meet the ticket verification condition, the response information including an instruction not to invoke the electronic ticket verification interface;
    displaying, in a corresponding display box on the client device, ticket verification failure prompt information included in the response information; and
    ending, by the client device, a ticket verification process.

3. The method of claim 2, the ending the ticket verification process comprising one of:
    ending, by the client device, the ticket verification process when the ticket verification failure prompt information indicates that the electronic ticket does not exist;
    ending, by the client device, the ticket verification process when the electronic ticket exists but the ticket verification failure prompt information indicates that an item session corresponding to the electronic ticket information does not exist in a ticket verification plan;
    ending, by the client device, the ticket verification process when the item session corresponding to the electronic ticket information is in the ticket verification plan but the ticket verification failure prompt information indicates that ticket verification for the item session corresponding to the electronic ticket information has ended; or
    ending, by the client device, the ticket verification process when the item session corresponding to the electronic ticket information is within a ticket verification period but the ticket verification failure prompt information indicates that a ticket status corresponding to electronic ticket credential information does not meet the ticket verification condition.

4. The method of claim 3, wherein the ticket status comprises a status selected from the group consisting of a validated, exchanged, refunded, and invalid status.

5. The method of claim 1, the electronic ticket information that meets a ticket verification condition comprising a ticket selected from the group consisting of an unverified ticket, an unexchanged ticket, and a ticket within a ticket verification period.

6. The method of claim 1, the displaying the electronic ticket verification interface comprising:
   displaying, by the client device in the corresponding display box, a ticket verification countdown interface when a current time is earlier than a ticket verification time, deleting the ticket verification countdown interface after the countdown ends, and displaying the verification interface in a same display box; or
   displaying, by the client device in the corresponding display box, the electronic ticket verification interface when the current time is within the ticket verification time.

7. The method of claim 1, the receiving ticket verification prompt information returned by the server comprising:
   receiving, by the client device, password error prompt information returned by the server in response to the password input information, resending the password input information within the limit of password input times, and locking the verification interface upon receiving prompt information from the server in response to the password input information, the prompt information indicating that a number of password errors reaches a maximum value; or
   receiving, by the client device, ticket verification success prompt information returned by the server in response to the password input information and receiving ticket verification status information of the electronic ticket.

8. The method of claim 1, further comprising:
   displaying, by the client device, prompt information for obtaining a paper print file of the electronic ticket when the ticket verification prompt information sent by the server comprises verification success prompt information.

9. A device comprising:
   a processor; and
   a storage medium for tangibly storing thereon program logic for execution by the processor, the stored program logic comprising:
      logic, executed by the processor, for sending a request for an electronic ticket verification interface to a server, the request including identification information of at least one purchased electronic ticket,
      logic, executed by the processor, for receiving response information from the server when the electronic ticket information meets a ticket verification condition, the response information including an electronic ticket verification interface invoking instruction,
      logic, executed by the processor, for displaying, in a corresponding display box, an electronic ticket verification interface by invoking the electronic ticket verification interface invoking instruction, the electronic ticket verification interface displaying a prompt for password input information,
      logic, executed by the processor, for receiving a touch screen switching instruction gesture,
      logic, executed by the processor, for switching at least one password collection interface of the verification interface according to the gesture,
      logic, executed by the processor, for receiving, at the device, the password input information via the at least one password collection interface, the password input information collected within a limit of password input times,
      logic, executed by the processor, for binding and encrypting the password input information collected via the at least one password collection interface and the electronic ticket identification information;
      logic, executed by the processor, for sending, to the server, the password input information collected via the at least one password collection interface and the electronic ticket identification information, and
      logic, executed by the processor, for receiving ticket verification prompt information returned by the server in response to the password input information.

10. The device of claim 9, the program logic further comprises:
   logic, executed by the processor, for receiving response information from the server when the electronic ticket information does not meet the ticket verification condition after sending the request for the electronic ticket verification interface to a server, the response information including an instruction not to invoke the electronic ticket verification interface;
   logic, executed by the processor, for displaying, in a corresponding display box, ticket verification failure prompt information included in the response information; and
   logic, executed by the processor, for ending a ticket verification process.

11. The device of claim 10, the logic for ending the ticket verification process comprising one of:
   logic, executed by the processor, for ending the ticket verification process when the ticket verification failure prompt information indicates that the electronic ticket does not exist;
   logic, executed by the processor, for ending the ticket verification process when the electronic ticket exists but the ticket verification failure prompt information indicates that an item session corresponding to the electronic ticket information does not exist in a ticket verification plan;
   logic, executed by the processor, for ending the ticket verification process when the item session corresponding to the electronic ticket information is in the ticket verification plan but the ticket verification failure prompt information indicates that ticket verification for the item session corresponding to the electronic ticket information has ended; or
   logic, executed by the processor, for ending the ticket verification process when the item session corresponding to the electronic ticket information is within a ticket verification period but the ticket verification failure prompt information indicates that a ticket status corresponding to electronic ticket credential information does not meet the ticket verification condition.

12. The device of claim 9, the logic for displaying the electronic ticket verification interface comprising:
   logic, executed by the processor, for displaying, in the corresponding display box, a ticket verification countdown interface when a current time is earlier than a ticket verification time, deleting the ticket verification countdown interface after the countdown ends, and displaying the verification interface in a same display box; or logic, executed by the processor, for displaying, in the corresponding display box, the electronic ticket verification interface when the current time is within the ticket verification time.

13. The device of claim 9, the logic for receiving ticket verification prompt information returned by the server comprising:
   logic, executed by the processor, for receiving password error prompt information returned by the server in response to the password input information, resending the password input information within the limit of password input times, and locking the verification interface upon receiving prompt information from the server in response to the password input information, the prompt information indicating that a number of password errors reaches a maximum value; or
   logic, executed by the processor, for receiving ticket verification success prompt information returned by the server in response to the password input information and receiving ticket verification status information of the electronic ticket.

14. The device of claim 9, the program logic further comprising:
   logic, executed by the processor, for displaying prompt information for obtaining a paper print file of the electronic ticket when the ticket verification prompt information sent by the server comprises verification success prompt information.

15. A non-transitory computer readable storage medium for tangibly storing computer program instructions capable of being executed by a computer processor, the computer program instructions defining the steps of:
   sending a request for an electronic ticket verification interface to a server, the request including identification information of at least one purchased electronic ticket;
   receiving response information from the server when the electronic ticket information meets a ticket verification condition, the response information including an electronic ticket verification interface invoking instruction;
   displaying, in a corresponding display box, an electronic ticket verification interface by invoking the electronic ticket verification interface invoking instruction, the electronic ticket verification interface displaying a prompt for password input information;
   receiving a touch screen switching instruction gesture;
   switching at least one password collection interface of the verification interface according to the gesture;
   receiving the password input information via the at least one password collection interface, the password input information collected within a limit of password input times;
   binding and encrypting the password input information collected via the at least one password collection interface and the electronic ticket identification information;
   sending, to the server, the password input information collected via the at least one password collection interface and the electronic ticket identification information; and
   receiving ticket verification prompt information returned by the server in response to the password input information.

16. The non-transitory computer readable storage medium of claim 15, wherein after sending the request for the electronic ticket verification interface to a server, the instructions further define the steps of:
   receiving, at the response information from the server when the electronic ticket information does not meet the ticket verification condition, the response information including an instruction not to invoke the electronic ticket verification interface;
   displaying, in a corresponding display box, ticket verification failure prompt information included in the response information; and
   ending a ticket verification process.

17. The non-transitory computer readable storage medium of claim 16, the ending the ticket verification process comprising one of:
   ending the ticket verification process when the ticket verification failure prompt information indicates that the electronic ticket does not exist;
   ending the ticket verification process when the electronic ticket exists but the ticket verification failure prompt information indicates that an item session corresponding to the electronic ticket information does not exist in a ticket verification plan;
   ending the ticket verification process when the item session corresponding to the electronic ticket information is in the ticket verification plan but the ticket verification failure prompt information indicates that ticket verification for the item session corresponding to the electronic ticket information has ended; or
   ending the ticket verification process when the item session corresponding to the electronic ticket information is within a ticket verification period but the ticket verification failure prompt information indicates that a ticket status corresponding to electronic ticket credential information does not meet the ticket verification condition.

18. The non-transitory computer readable storage medium of claim 15, the displaying the electronic ticket verification interface comprising:
   displaying, in the corresponding display box, a ticket verification countdown interface when a current time is earlier than a ticket verification time, deleting the ticket verification countdown interface after the countdown ends, and displaying the verification interface in the same display box; or
   displaying, in the corresponding display box, the electronic ticket verification interface when the current time is within the ticket verification time.

* * * * *